US012743915B2

(12) United States Patent
Stein

(10) Patent No.: US 12,743,915 B2
(45) Date of Patent: Sep. 22, 2026

(54) SYSTEM FOR MONITORING A LIGHTING UNIT

(71) Applicant: Torc Robotics, Inc., Blacksburg, VA (US)

(72) Inventor: Fridtjof Stein, Ostfildern (DE)

(73) Assignee: Torc Robotics, Inc., Blacksburg, VA (US)

( * ) Notice: Subject to any disclaimer, the term of this patent is extended or adjusted under 35 U.S.C. 154(b) by 7 days.

(21) Appl. No.: 19/085,161

(22) Filed: Mar. 20, 2025

(65) Prior Publication Data

US 2025/0391211 A1 Dec. 25, 2025

(51) Int. Cl.
*G07C 5/00* (2006.01)
*G07C 5/08* (2006.01)

(52) U.S. Cl.
CPC .................................. *G07C 5/0808* (2013.01)

(58) Field of Classification Search
CPC .................................................... G07C 5/0808
See application file for complete search history.

(56) References Cited

U.S. PATENT DOCUMENTS

2004/0160199 A1* 8/2004 Morgan ................. H05B 47/10 315/312
2007/0236159 A1* 10/2007 Beland ................. H05B 45/395 315/312
2010/0049454 A1* 2/2010 Irissou ................... H05B 45/58 702/58
2011/0016212 A1* 1/2011 Matsumoto ........... H04L 12/403 709/224
2012/0119661 A1* 5/2012 Muller ................... H05B 45/58 315/307
2012/0287334 A1* 11/2012 Feri ...................... H05B 47/155 348/370
2014/0339985 A1* 11/2014 Engelen ................. H05B 45/20 315/151
2015/0373819 A1* 12/2015 Takashiro ............ H05B 41/325 315/151
2016/0165692 A1* 6/2016 Gershowitz ............ H05B 45/10 315/121
2017/0138559 A1* 5/2017 Hartisch ................. F21S 41/16
(Continued)

FOREIGN PATENT DOCUMENTS

CN 116389910 A * 7/2023 ............. H04N 23/74

OTHER PUBLICATIONS

Kim et al., Empirical Analysis of Autonomous Vehicle's LiDAR Detection Performance Degradation for Actual Road Driving in Rain and Fog. Sensors. 2023;23(2972):2972, 26 pages.

*Primary Examiner* — Peter D Nolan
*Assistant Examiner* — Peter Y Ning
(74) *Attorney, Agent, or Firm* — McCarter & English, LLP

(57) ABSTRACT

The present disclosure relates to a device for monitoring a lighting unit which has a plurality of lighting sub-units, wherein for each lighting sub-unit or for each group of lighting sub-units includes a monitoring unit with a detector, which is configured to monitor a light output of the lighting sub-unit or group. The detector is further configured to monitor a trigger signal for controlling the lighting sub-unit or group and a power consumption of the lighting sub-unit or group, wherein a monitoring collector unit is arranged and coupled to all monitoring units in order to determine a total output from the data recorded by them.

17 Claims, 2 Drawing Sheets

(56) References Cited

U.S. PATENT DOCUMENTS

| | | | | |
|---|---|---|---|---|
| 2018/0050704 | A1* | 2/2018 | Tascione | G07C 5/0808 |
| 2019/0185034 | A1* | 6/2019 | Smith | B61L 5/1881 |
| 2019/0329802 | A1* | 10/2019 | Beier | B61L 5/1845 |
| 2020/0209848 | A1* | 7/2020 | Mercep | G05D 1/0088 |
| 2021/0197859 | A1* | 7/2021 | Canady | G05D 1/0231 |
| 2022/0204006 | A1* | 6/2022 | Tsuji | B60W 60/00186 |
| 2022/0363276 | A1* | 11/2022 | Wulf | B60W 50/029 |
| 2023/0182753 | A1* | 6/2023 | Chen | B60W 50/0205 701/29.2 |
| 2023/0332909 | A1* | 10/2023 | Konrardy | B60R 21/0136 |
| 2025/0247936 | A1* | 7/2025 | Veig | G01S 7/497 |
| 2025/0342955 | A1* | 11/2025 | Forsgren | G16H 40/67 |

* cited by examiner

SYSTEM FOR MONITORING A LIGHTING UNIT

CROSS-REFERENCE TO RELATED APPLICATIONS

The present application claims priority to German Patent Application No. 102024117867.1 filed on Jun. 25, 2024, and titled "DEVICE FOR MONITORING A LIGHTING UNIT", which is hereby incorporated by reference in its entirety.

TECHNICAL FIELD

The present disclosure relates to a device for monitoring a lighting unit. In particular, the present disclosure relates to controlling an autonomous vehicle partially based on a parameter of the lighting unit as detected by the device.

BACKGROUND

In the future, automatically driving vehicles, such as trucks, will be underway on freeways. Such vehicles will locate themselves using sensors (typically LIDAR, camera, radar) and map data in the existing infrastructure and adjust their driving behavior depending on other road users measured by the sensors. The sensor system installed for this purpose has measurement characteristics that are determined by the sensor type, the design, and physical boundary conditions. Typically, the built-in sensor system has various sensors for performing different tasks. For example, a LIDAR sensor measures a traffic-relevant area in front of the vehicle in three dimensions. At the same time, the data from a camera are used to determine the semantics of the observed scenery, for example to recognize traffic signs and traffic lights. Requirements derived therefrom then determine sensor parameters such as base width, focal length, aperture angle, pixel density, sensor type (color or monochrome), etc.

Gated cameras are known and are based on a lighting concept that avoids back-scatter, resulting in very good visibility and uniform illumination, including suitability for use in rain.

These cameras make it possible to detect objects at great distances that cannot be overcome, since the lighting units coupled thereto send enough photons that, within the scope of eye safety, the signal-to-noise ratio is good enough to detect the object, for example a tire or lost cargo, or a motorcyclist who has had an accident.

If the output power of the lighting unit decreases, for example due to aging or failure of components, then the vehicle's autonomous system must take into account a correspondingly reduced detection range, for example when planning trajectories to be driven and the speed in order to adapt to a reduced braking distance.

The object of the present disclosure is to specify a novel device for monitoring a lighting unit, a novel control unit for an autonomous vehicle and a novel autonomous vehicle.

BRIEF DESCRIPTION

According to an aspect of the present disclosure, a device for monitoring a lighting unit is proposed which has a plurality of lighting sub-units. According to the present disclosure, a monitoring unit with a detector is arranged for each lighting sub-unit or for each group of lighting sub-units, which is configured to monitor: a light output of the lighting sub-unit or group, a trigger signal for controlling the lighting sub-unit or group, and a power consumption of the lighting sub-unit or group. A monitoring collector unit is arranged and coupled to all monitoring units in order to determine a total output from the data recorded by them.

The solution according to the present disclosure enables the detection of the failure of lighting units or the degradation of the performance of the lighting units, for example due to defects or aging.

The solution according to the present disclosure is particularly suitable for gated cameras, but also for other sensors with electromagnetically transmitting lighting units, for example LIDAR sensors.

The solution according to the present disclosure improves safety of a vehicle because the vehicle can constantly adapt to its detection horizon, even with slight degradation of the lighting units. Furthermore, the solution according to the present disclosure enables the early detection of problems, since aging or faulty components are immediately identified. Maintenance alarms can be issued to inform a maintenance team about the need for repairs or replacement of parts. Timely repair or replacement can maintain the reliability and service life of the sensor systems and prevent their failure. This also avoids major breakdowns and emergency repairs and thus costs.

DETAILED DESCRIPTION

Exemplary embodiments of the present disclosure will be explained in more detail hereinafter with reference to drawings.

Corresponding parts are provided with the same reference numerals in all figures.

DETAILED DESCRIPTION

Figure 1:
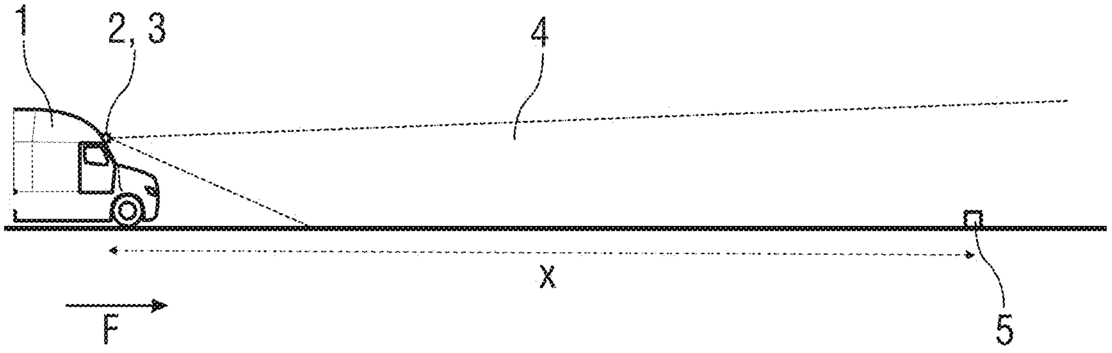
FIG. 1 shows a schematic view of a vehicle with an environment sensor system, comprising at least one sensor for detecting an environment ahead in the direction of travel and at least one lighting unit for illuminating the environment.

FIG. 1 shows a schematic view of a vehicle 1, in particular a commercial vehicle 1, with an environment sensor system, comprising at least one sensor 2 for detecting an environment ahead in the direction of travel F and at least one lighting unit 3 for illuminating the environment.

The sensor 2 can be, for example, a camera, in particular a gated camera, or a LIDAR sensor.

The vehicle 1 can be designed as an autonomous or semi-autonomous vehicle 1.

For simplification, it is assumed in FIG. 1 that a frustum 4 of the sensor 2 corresponds to a frustum 4 of the illumination unit 3. However, the technical solution described below does not necessarily require this assumption.

For safe operation of the autonomous vehicle 1, its braking distance must be shorter than a detection range x.

The lighting unit 3 can be designed, for example, as a light source in the visible range of the electromagnetic spectrum or as an infrared light source, for example in the near infrared range (NIR). Such a light source is used, for example, in night-time driving, but can also be used in daytime driving.

The maximum detection range x for photons emitted by the lighting unit 3 can be determined under the assumption that they are reflected by an object 5, for example an object 5 that cannot be overcome, at a minimum reflectivity of, for example, 5% and that the sensor 2 then detects the reflected photons. The signal-to-noise ratio (SNR) should be above a certain minimum, for example above a value of four.

The number of photons that must be emitted to satisfy these conditions is proportional to the fourth power of the detection range x. Doubling the detection range x therefore requires sixteen times the number of photons. Conversely, a reduction in the number of photons by 10% causes a shortening of the detection range x by 65%.

If the output power of the lighting unit decreases, for example due to aging or failure of components, then the vehicle's autonomous system must take into account a correspondingly reduced detection range, for example when planning trajectories to be driven and the speed in order to adapt to a reduced braking distance.

Figure 2:
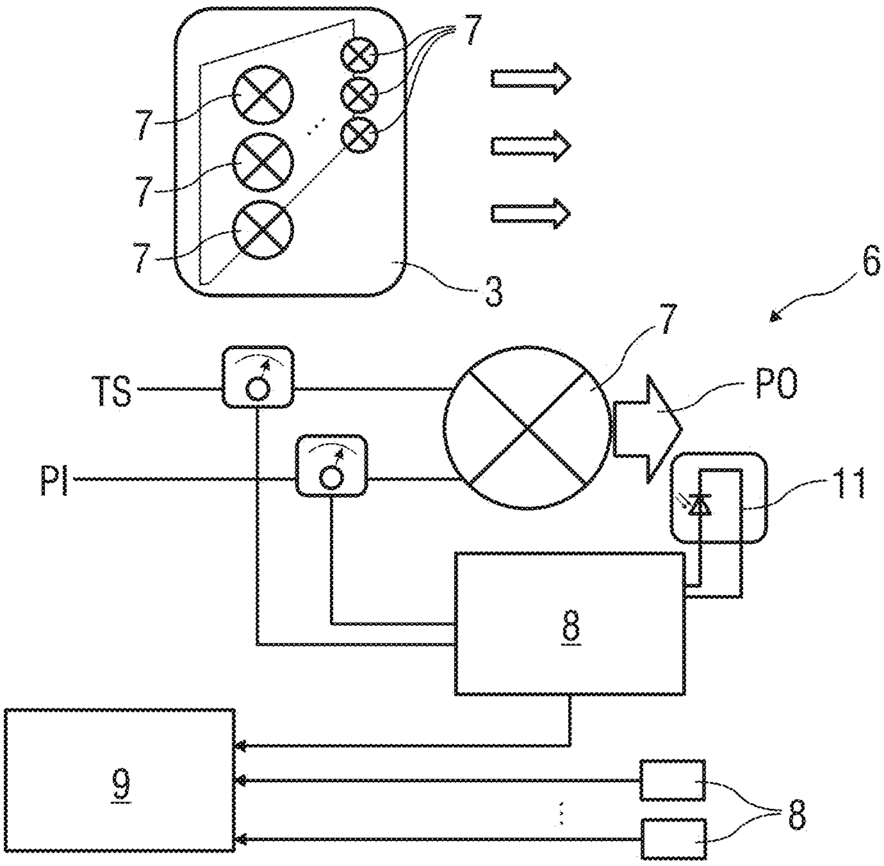
FIG. 2 shows a schematic view of a device for monitoring the lighting unit.

FIG. 2 is a schematic view of a device 6 for monitoring the lighting unit 3. The lighting unit 3 has, for example, a plurality, for example an array, of lighting sub-units 7, for example LEDs, lasers, surface emitters (VCSEL) and/or lasers with Q-switches (q-switched lasers).

For each lighting sub-unit 7, a monitoring unit 8 is arranged, which is configured to monitor the light output PO of the lighting sub-unit 7, which is proportional to the number of emitted photons, a trigger signal TS for controlling the lighting sub-unit 7, and a power consumption PI of the lighting sub-unit 7. A suitable detector 11 can be arranged to monitor the light output PO.

Alternatively, groups of lighting sub-units 7 of the lighting unit 3 can each be monitored by a common monitoring unit 8. This is a cheaper solution.

Furthermore, a monitoring collector unit 9 is arranged, which is coupled to all monitoring units 8. These send their data to the monitoring collector unit 9, which calculates a total power output and transmits it to a behavior module 10 shown in FIG. 3.

The monitoring units 8 can be configured to evaluate a performance-related health status of the respective lighting sub-unit 7 or group of lighting sub-units 7 based on an energy consumption curve. A latency between the trigger signal TS and a light pulse of the illumination sub-unit 7 can provide further clues. The amount of light is crucial for the overall performance. The method steps mentioned are merely examples. Other methods can also be used.

Figure 3:
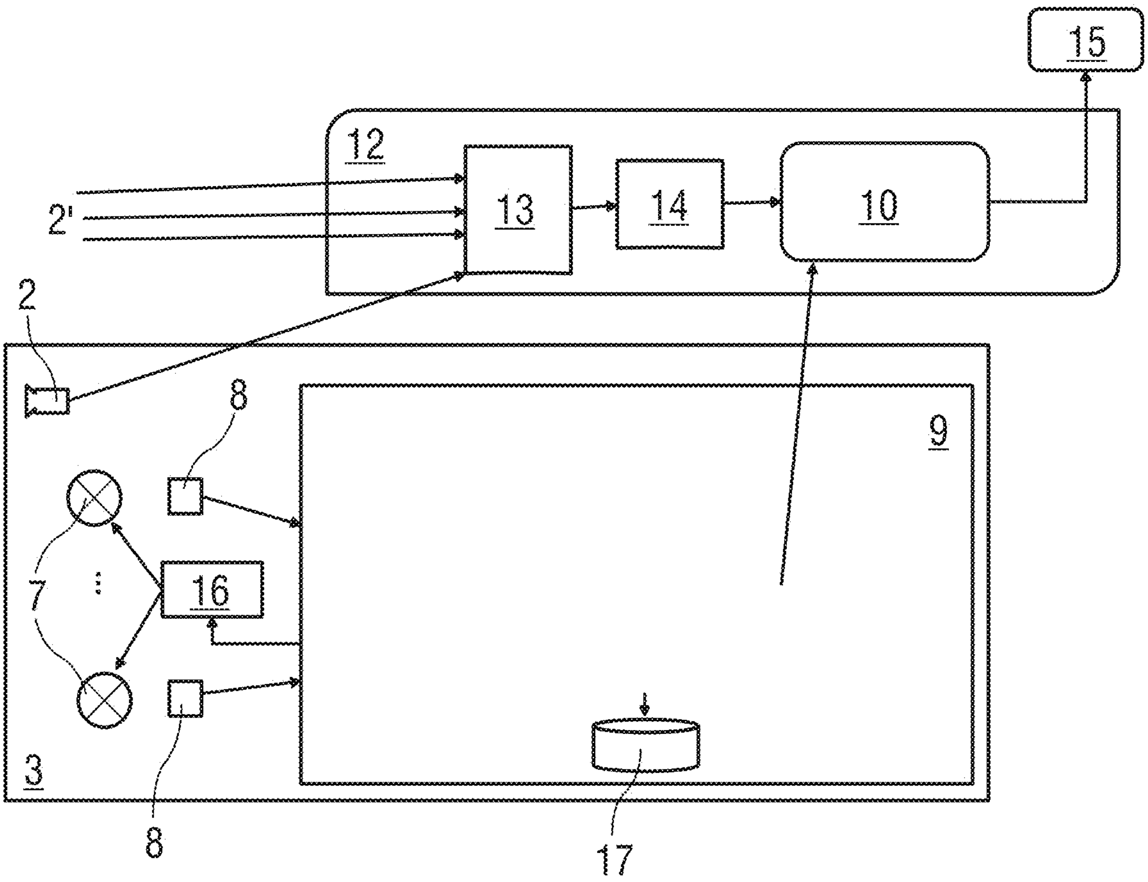
FIG. 3 shows a schematic view of an exemplary processing chain for operating the vehicle.

FIG. 3 is a schematic view of an exemplary processing chain for operating the autonomous vehicle 1. At least predominantly only those components are shown that have a relation to the present disclosure. Therefore, additional components may be provided.

In particular, a control unit 12 is provided which has a fusion module 13, a digital map 14 and the above-mentioned behavior module 10 for planning the behavior, in particular trajectories, of the vehicle 1. The trajectories planned by the behavior module 10 are fed by an actuator 15, comprising steering, accelerator and brake, for the longitudinal and lateral control of the vehicle 1.

Signals from at least one active sensor 2 and further sensors 2' are fed to the fusion module 13, fused there, compared with the digital map 14 and made available to the behavior module 10.

If the lighting unit 3 with its lighting sub-units 7 is active, then these are monitored by the monitoring units 8 as described above for FIG. 2 and their data is summarized in the monitoring collector unit 9. A lighting power value determined thereby is transmitted to the behavior module

10, which can then adapt the behavior of the vehicle 1, in particular its trajectories and speed, accordingly.

If it is determined that the performance of certain lighting sub-units 7 is decreasing or becoming weaker, the monitoring collector unit 9 can, via a power control unit 16, control other lighting sub-units 7 for increased power output, for example by overclocking, in order to compensate for the loss of performance. However, this comes at the expense of their service life and should therefore be carefully logged and taken into account at the next maintenance appointment. For logging purposes, the monitoring collector unit 9 may have a memory 17.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

The invention claimed is:

1. A device for monitoring a lighting unit, the device comprising:

a plurality of lighting sub-units, wherein each lighting sub-unit or each group of lighting sub-units comprises a monitoring unit with a detector the detector is configured to monitor:

a light output of the lighting sub-unit or the group of lighting sub-units, a trigger signal configured to control the lighting sub-unit or the group of lighting sub-units, and a power consumption of the lighting sub-unit or the group of lighting sub-units, wherein a monitoring collector unit is coupled to all monitoring units and is configured to determine a total output based on the light output, the trigger signal, and the power consumption.

2. The device according to claim 1, wherein the monitoring units are configured to evaluate a performance-related health status of the respective lighting sub-unit or group of lighting sub-units based on an energy consumption curve.

3. The device according to claim 2, wherein the monitoring units are configured to determine a latency between the trigger signal and a light pulse of the lighting sub-unit and to evaluate the state of health of the respective lighting sub-unit or the group of lighting sub-units partially based on the determined latency.

4. The device according to claim 2, wherein the monitoring collector unit is configured to control at least one of the lighting sub-units for increased power output via a power control unit when the power of certain lighting sub-units decreases in order to compensate for the drop in power and to log the control in a memory.

5. The device according to claim 1, wherein the monitoring units are configured to determine a latency between the trigger signal and a light pulse of the lighting sub-unit and to evaluate the state of health of the respective lighting sub-unit or the group of lighting sub-units partially based on the determined latency.

6. The device according to claim 5, wherein the monitoring collector unit is configured to control at least one of the lighting sub-units for increased power output via a power control unit when the power of certain lighting sub-units decreases in order to compensate for the drop in power and to log the control in a memory.

7. The device according to claim 1, wherein the monitoring collector unit is configured to control at least one other of the lighting sub-units for increased power output via a power control unit when the power of certain lighting sub-units decreases in order to compensate for the drop in power and to log the control in a memory.

8. A control unit for an autonomous vehicle, the control unit comprising:

- a fusion module, a digital map and a behavior module, wherein:
- the fusion module is configured to fuse data from at least one active sensor and further sensors,
- the behavior module is configured to plan a behavior of the vehicle and control an actuator system for longitudinal and lateral control of the vehicle based on the fused data compared with the digital map, and
- the behavior module is configured to adapt the behavior of the vehicle as a function of a total power of a lighting unit of the vehicle for illuminating a detection area of the at least one active sensor, determined by a device, such that the braking distance of the vehicle is shorter than a detection range of the at least one active sensor,
- the device comprising a monitoring unit with a detector which is configured to monitor:
  - a light output of a lighting sub-unit or a group of the lighting units,
  - a trigger signal configured to control the lighting sub-unit or the group of lighting sub-units, and
  - a power consumption of the lighting sub-unit or the group of lighting sub-units,
  - wherein a monitoring collector unit is coupled to all monitoring units and is configured to determine a total output based on the light output, the trigger signal, and the power consumption.

9. The control unit according to claim 8, wherein the behavior of the autonomous vehicle is a speed of the autonomous vehicle.

10. The control unit according to claim 8, wherein the monitoring units are configured to evaluate a performance-related health status of the respective lighting sub-unit or the group of lighting sub-units based on an energy consumption curve.

11. The control unit according to claim 8, wherein the monitoring units are configured to determine a latency between the trigger signal and a light pulse of the lighting sub-unit and to evaluate the state of health of the respective lighting sub-unit or the group of lighting sub-units partially based on the determined latency.

12. The control unit according to claim 8, wherein the monitoring collector unit is configured to control at least one of the lighting sub-units for increased power output via a power control unit when the power of certain lighting sub-units decreases in order to compensate for the drop in power and to log the control in a memory.

13. An autonomous vehicle with an environment sensor system, the autonomous vehicle comprising:

- at least one active sensor configured to detect an environment ahead in the direction of travel;
- at least one lighting unit configured to illuminate a detection area of the sensor;
- a device comprising a monitoring unit with a detector which is configured to monitor:
  - a light output of a lighting sub-unit or a group of lighting sub-units,
  - a trigger signal configured to control the lighting sub-unit or the group of lighting sub-units, and
  - a power consumption of the lighting sub-unit or the group of lighting sub-units,
  - wherein a monitoring collector unit is coupled to all monitoring units and is configured to determine a total output based on the light output, the trigger signal, and the power consumption,
  - and wherein the device is configured to monitor the lighting unit; and the autonomous vehicle further comprising;
- a control unit comprising:
  - a fusion module,
  - a digital map, and
  - a behavior module, wherein:
  - the fusion module is configured to fuse data from at least one active sensor and further sensors,
  - the behavior module is configured to plan a behavior of the vehicle and control an actuator system for longitudinal and lateral control of the vehicle based on the fused data compared with the digital map, and
- wherein the behavior module is configured to adapt the behavior of the vehicle as a function of a total power of a lighting unit for illuminating a detection area of the active sensor.

14. The autonomous vehicle according to claim 13, wherein the behavior of the autonomous vehicle is a speed of the autonomous vehicle.

15. The autonomous vehicle according to claim 13, wherein the monitoring units are configured to evaluate a performance-related health status of the respective lighting sub-unit or the group of lighting sub-units based on an energy consumption curve.

16. The autonomous vehicle according to claim 13, wherein the monitoring units are configured to determine a latency between the trigger signal and a light pulse of the lighting sub-unit and to evaluate the state of health of the respective lighting sub-unit or the group of lighting sub-units partially based on the determined latency.

17. The autonomous vehicle according to claim 13, wherein the monitoring collector unit is configured to control at least one of the lighting sub-units for increased power output via a power control unit when the power of certain lighting sub-units decreases in order to compensate for the drop in power and to log the control in a memory.

* * * * *